United States Patent [19]

Smock

[11] 4,282,970

[45] Aug. 11, 1981

[54] OSCILLATING-ACCUMULATING CONVEYOR

[76] Inventor: William L. Smock, 5831 S. Meridian St., Indianapolis, Ind. 46217

[21] Appl. No.: 107,128

[22] Filed: Dec. 26, 1979

[51] Int. Cl.³ .............................................. B65G 25/04
[52] U.S. Cl. .................................................... 198/772
[58] Field of Search ................................. 198/772, 750

[56] References Cited

U.S. PATENT DOCUMENTS

| 2,820,542 | 1/1958 | Oswald | 198/772 |
| 3,048,258 | 8/1962 | Skold | 198/772 X |
| 3,486,609 | 12/1969 | Rogers | 198/772 |
| 3,767,064 | 10/1973 | Lutz | 198/772 |

FOREIGN PATENT DOCUMENTS 398470 9/1973 U.S.S.R. ................................. 198/772

Primary Examiner—James L. Rowland
Attorney, Agent, or Firm—Blanchard, Flynn, Thiel, Boutell & Tanis

[57] ABSTRACT

An oscillating conveyor provided with an elongated low-profile frame having support wheels thereon. A plurality of conveyor rolls are rotatably supported on the frame at intervals therealong, which rolls define a horizontal support plane for a load to be conveyed. A drive device is connected to the frame to horizontally oscillate it back and forth through a stroke of predetermined length. A plurality of one-way holding members are mounted at closely spaced intervals along the length of the conveyor, which holding members permit one-way movement of loads along the conveyor but prevent backward movement thereof. When the frame is moved forwardly by the drive, the rolls remain substantially nonrotatable and hence move the loads forwardly through a predetermined step, during which forward movement the holding members are retracted to permit the loads to pass thereby. During the rearward stroke, the holding members engage the loads and prevent their rearward movement, whereby the rolls freely rotate beneath the load as the conveyor frame is retracted.

2 Claims, 4 Drawing Figures

OSCILLATING-ACCUMULATING CONVEYOR

FIELD OF THE INVENTION

This invention relates to an improved conveyor of the oscillating type, which conveyor incorporates live conveying rollers while enabling the conveyor to be of extremely low profile and of minimum structural complexity.

BACKGROUND OF THE INVENTION

Many production and manufacturing operations use an assembly-line process wherein the product or article is sequentially moved in a steplike manner between adjacent working stations. These assembly-line processes utilize various types of conveyors for accomplishing the intermittent steplike movement of the article. While many different types of conveyors are commonly utilized, such as powered accumulating-type roller conveyors, chain conveyors and the like, nevertheless many of the conventionally utilized conveyors have possessed various disadvantages when considered for use under some assembly-line conditions. For example, many of the known conveyors are both structurally and operationally complex, and hence expensive to purchase and maintain. Other conveyors are undesirable as to their space requirements, such as by requiring a rather large structural frame so that the conveyor bed is hence at an undesirably high elevation, or requiring either overhead or below-floor level supports which thus make initial installation and assembly of the conveyor extremely difficult and at the same time prevent efficient movement and/or modification of the conveyor system.

The present invention thus relates to an improved oscillating conveyor which permits accumulating thereon, which conveyor is particularly desirable for use with an assembly-line process while overcoming the disadvantages and undesirable restrictions associated with many of the conventional conveyors now being utilized, as explained above.

The improved conveyor of this invention is particularly desirable for assembly-line processes since the conveyor is extremely simple both structurally and operationally, and due to its oscillating movement, permits the efficient intermittent or steplike transfer of articles or product along the conveyor for movement between adjacent working stations. This improved conveyor is particularly advantageous inasmuch as it can be constructed with an extremely low profile, such as in the order of several inches, while at the same time it can efficiently handle not only light loads but also extremely heavy loads (particularly palletized loads) in the order of several thousand pounds. This conveyor can additionally be positioned directly on any available support surface, such as directly on a floor, without requiring any special preparation of the floor and without requiring any overhead or below-floor level supports. The conveyor can thus be easily installed and readily moved about as desired, and the low profile of the conveyor enables it to occupy a minimum space so that the elevation of the support bed defined by the conveyor can be easily disposed at a desired working level.

The improved oscillating conveyor of the present invention, because of its extremely low profile coupled with its structural and operational simplicity, is also highly desirable for incorporation into a storage rack system of the "first in-first out" type. Such storage rack systems, which conventionally provide several horizontally adjacent bays each containing a plurality of elongated conveyors stacked vertically one above the other, have conventionally utilized either a powered roller conveyor or an inclined gravity-type roller conveyor. The former is undesirable due to the overall complexities involved in providing such a large number of powered systems, inasmuch as the powered rollers must be positioned throughout the complete conveyor length. The latter system, namely the inclined gravity roller conveyor, while less complex from the drive standpoint, is nevertheless undesirable due to the necessity of having to provide braking rollers or suitable stops associated with the conveyor. Also, the required incline of the individual conveyors results in the inlet end of each conveyor being substantially higher than the outlet end when the conveyor extends over substantial distances. This thus restricts the length of such conveyors or, in the alternative, results in the inlet end of the uppermost conveyor being undesirably high, and hence this factor and/or the available building height hence further restricts either the usable length of the conveyor and/or the number of conveyors which can be successfully vertically stacked one above the other.

The conveyor of the present invention is also highly desirable for use in storage racks of the above-described type, since its extremely low profile coupled with an extremely simple drive mechanism, and the fact that the conveyor extends horizontally and does not require any incline or slope, thus permits this improved conveyor to be successfully and efficiently utilized in a storage rack system while overcoming the numerous disadvantages and limitations experienced with conventional storage rack systems, as explained above.

In the conveyor of this invention, there is provided an elongated low-profile frame having wheels thereon which rollingly support the frame on any suitable support surface, such as a floor. A plurality of live conveyor rolls are rotatably supported on the frame at uniform intervals therealong, which rolls define a support plane for an object or article to be conveyed. A suitable drive device, such as a fluid pressure cylinder, is connected to the support frame to thereby cause it, and the rollers mounted thereon, to be horizontally oscillated back and forth in the elongated direction thereof through a stroke of predetermined length. A plurality of stop members are mounted at closely spaced intervals along the length of the conveyor, which stop members are mounted directly on any adjacent stationary support, such as the floor. The stop members permit one-way movement of the objects or articles along the conveyor, and in one embodiment the stop members are pivotally mounted so as to swing downwardly to enable the articles or objects to pass thereover, with the individual stop members being biased back into an upright position whereby they project into the path of movement of the objects or articles, thereby preventing backward movement of the individual objects or articles. When the frame is moved forwardly by the drive, the rollers remain substantially nonrotatable and hence move the articles forwardly through a predetermined step, during which forward movement the stop members are swung downwardly so as to permit the articles to pass thereover. During the rearward stroke of the support frame, the stop members which are located between articles have already swung upwardly into their original positions and hence engage the articles and prevent their rearward movement, whereby the rollers associated with the conveyor thus freely rotate beneath the article as the conveyor frame is being moved on its backward or retraction stroke. Thus, as the conveyor is reciprocated back and forth, the articles or objects are advanced in an intermittent steplike manner throughout the length of the conveyor.

While the attached drawings illustrate what is presently contemplated as a preferred embodiment of the invention, it will be appreciated that the present invention can also be incorporated into other desirable embodiments which fall within the scope of the invention but are not illustrated by the drawings. Other objects and purposes of the invention will be apparent to persons familiar with conveyors upon reading the following specification and inspecting the accompanying drawings.

Figure 1:
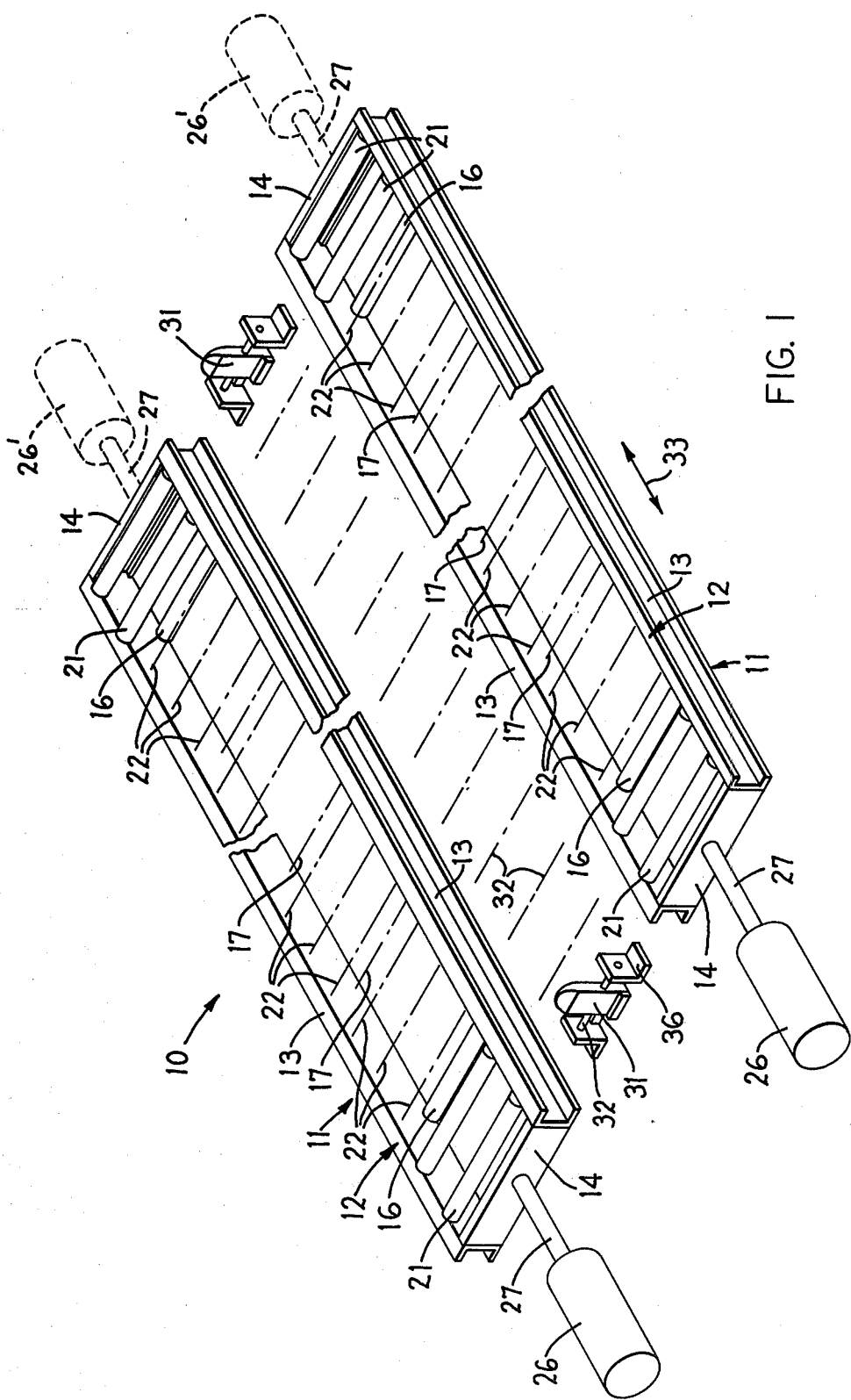
FIG. 1 is a perspective view illustrating a preferred embodiment of the conveyor according to this invention.
Figure 2:
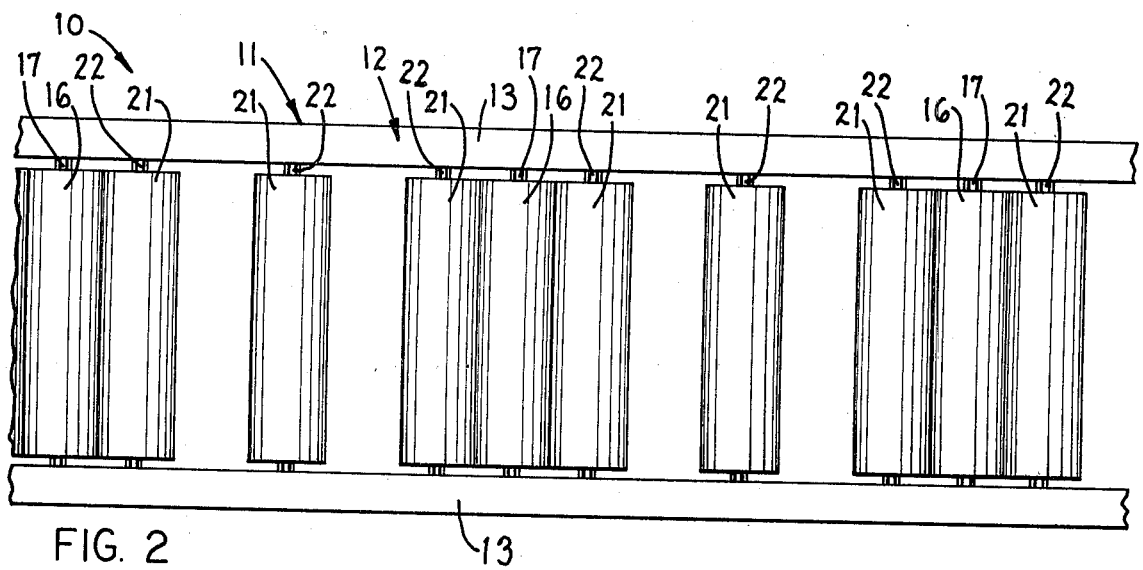
FIG. 2 is a partial top view of the conveyor.
Figure 3:
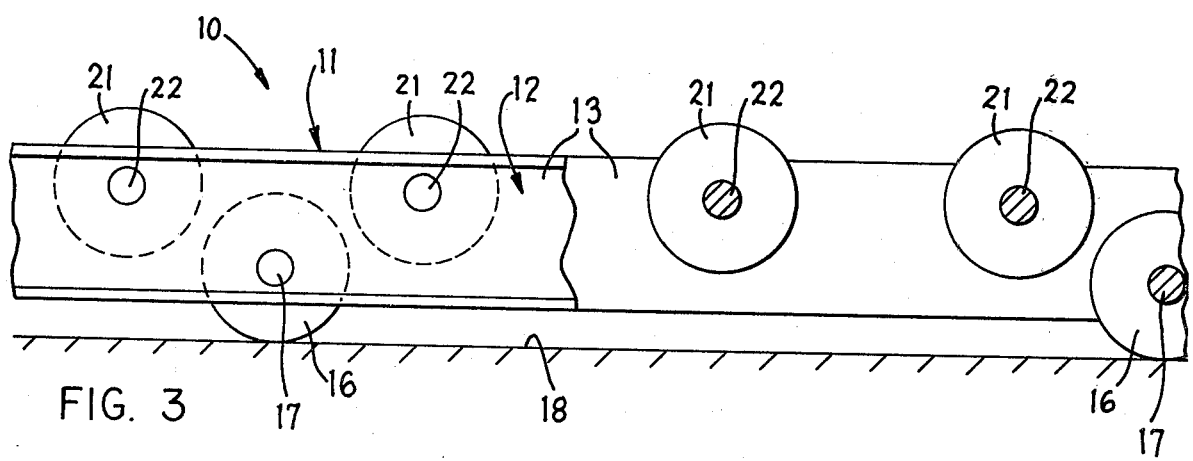
FIG. 3 is a side view, partially in cross section, of the conveyor as shown in FIG. 2.

Certain terminology will be used in the following description for convenience in reference only. For example, the words "upwardly", "downwardly", "leftwardly" and "rightwardly" will refer to directions in the drawings to which reference is made. The word "forwardly" will refer to the normal direction of movement of articles along the conveyor, which direction is rightwardly in FIGS. 1-4, and "rearwardly" will refer to the opposite direction. The words "inwardly" and "outwardly" will refer to directions toward and away from, respectively, the geometric center of the conveyor and designated parts thereof. Said terminology will include the words specifically mentioned, derivatives thereof, and words of similar import.

DETAILED DESCRIPTION

FIG. 1 illustrates therein an oscillating conveyor 10 according to the present invention. This conveyor includes a pair of elongated conveyor sections 11 which are identical and are disposed so as to extend in parallel relationship with one another, the two sections being sidewardly spaced apart.

The conveyor section 11 includes a horizontally elongated low-profile frame 12 which, in the illustrated embodiment, is formed by a pair of elongated parallel side rails 13 which are rigidly joined together by transversely extending end plates 14. The side rails 13 are, in the illustrated embodiment, conventional channel members, although they can obviously have any other desired configuration.

The frame 12 has mounted thereon a plurality of bottom rollers 16, hereinafter referred to as wheels. These wheels are spaced at uniform and selected intervals in the longitudinal direction of the frame, and are individually rotatably supported by axles 17 which extend perpendicularly between and are supported on the opposite side rails 13. These wheels 16 are positioned so that the lowermost point of the wheels, specifically the wheel periphery or tread, projects slightly below the lowermost surface of the frame 12 so that the wheels thus rollingly engage a suitable support surface 18, such as a floor. These wheels 16 thus rollingly support the conveyor section 11 on the floor while permitting the conveyor section, and specifically its frame, to be of low profile and hence positioned closely adjacent the floor.

The conveyor section 11 also includes a plurality of conveyor rollers 21, normally referred to as live rollers. These rollers 21 are uniformly spaced apart throughout the longitudinal direction of the conveyor section, and each conveyor roller 21 is individually rotatably supported on an axle 22 which extends perpendicularly between and is supported on the side rails 13. The conveyor rollers 21 are normally supported on their respective axles by conventional bearings (not shown), the rollers thus being individually freely rotatable about horizontal rotational axes which extend perpendicular to the horizontal direction of movement of the conveyed articles.

The conveyor section 11 is horizontally reciprocated with a linear back-and-forth movement by means of any suitable drive device, which in the illustrated embodiment comprises a conventional fluid pressure cylinder 26. The cylinder 26 is mounted with its housing stationarily disposed relative to the support surface 18, and the piston rod 27 of the cylinder 26 is suitably joined to one of the end plates 14. The cylinder 26, which may be either pneumatic or hydraulic, can be of the double-acting type so that pressure fluid is alternately supplied to opposite sides of the cylinder piston, thereby causing reciprocating movement of the piston rod 27 and of the conveyor section 11 coupled thereto. The cylinder 26 can be coupled to the conveyor section 11 at any location therealong or, if desired, the conveyor section can be connected to a pair of opposed cylinders, such as the cylinders 26 and 26', each being of the single-acting type so that the cylinder 26 causes the forward or advancing movement of the conveyor section, whereas the opposite cylinder 26' causes the rearward or retracting movement thereof.

The two conveyor sections 11 each preferably have a cylinder 26 associated therewith, which cylinders are simultaneously and synchronously activated so that the two conveyor sections 11 are thus simultaneously and synchronously reciprocated back and forth and hence operate as a unitary assembly. For this purpose, the cylinders 26 are associated with a conventional fluid pressure circuit for activating the cylinders 26 with the desired synchronization and programmed sequence. Such fluid pressure circuits are well known and understood by those of ordinary skill in this art, and hence a detailed illustration and explanation of such circuit is thus believed unnecessary.

To insure that the articles are moved unidirectionally, the conveyor 10 includes a plurality of one-way holding members 32 disposed in spaced relationship within a row which extends parallel with the longitudinal direction of the conveyor. This row of holding members 31, hereinafter referred to as dogs, is disposed substantially midway between the conveyor sections 11 so that the dogs are positioned to engage the rear side of the article substantially centrally thereof.

Figure 4:
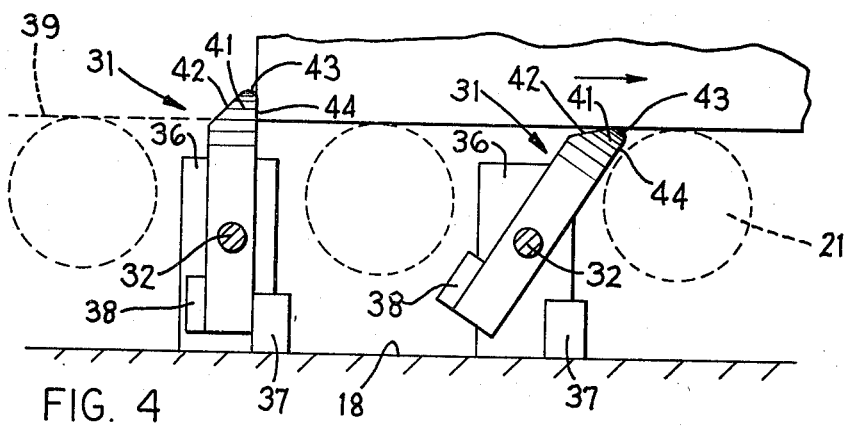
FIG. 4 is a vertical sectional view taken along line IV—IV in FIG. 1 and illustrating the relationship between the conveyor rolls, the movable dogs, and the article being conveyed.

The dog 31, as illustrated by FIGS. 1 and 4, is formed as an elongated lever which is centrally pivotally supported by a pivot axle 32, the latter defining a pivot axis which extends horizontally in perpendicular relationship to the direction of movement of the conveyor, this latter movement direction being indicated by the arrow 33. The pivot axle 32 is in turn mounted on support brackets 36 which, in the illustrated embodiment, are fixedly secured relative to the support surface 18.

The lever or dog 31 is normally urged into a substantially upright position as indicated in FIG. 4, whereupon the lower end of the dog bears against a fixed stop 37 which prevents the dog from rotating in a counterclockwise direction. This urging or biasing of the dog 31 against the stop 37 can be accomplished by springs, if desired, although it is preferably accomplished utilizing a suitable counterweight 38 fixed to the lower end of the dog.

The upper end of the dog projects a substantial distance above the pivot axle 32 and, when the dog 31 is in its upright position, projects at least slightly above the horizontal support plane 39 defined by the uppermost points on the conveyor rollers 21. This projecting upper end of the dog 31, hereinafter referred to as the tip 41, is preferably provided with a sloped or tapered camlike surface 42 on the upstream side thereof, which surface projects upwardly in the downstream direction so that the tip at its upper end terminates in a nose 43, the latter preferably being roughened or serrated so as to effectively define a holding surface for a purpose to be explained hereinafter. The forward or downstream side of the tip defines a substantially perpendicularly extending stop surface 44 adapted for engaging the rear side of the conveyed load or article L when the dog is in its upright position.

OPERATION

The load L to be conveyed, such as a palletized load or article, is deposited on the inlet end (the leftward end) of the conveyor 10, as by a fork lift or other suitable apparatus. The load extends between the conveyor sections 11 so as to be supported by the rollers 21 associated with each section, which results in the row of dogs 31 being substantially aligned with and positioned for passing under the center of the load L. To initiate the conveying movement, the power cylinders 26 are energized so that the conveyor sections 11 are linearly moved forwardly (rightwardly in the drawings) through a predetermined stroke. During this rightward or advancing movement, the complete frame 12 is linearly moved forwardly due to the wheels 16 being rollingly engaged with the support surface 18. The load L remains stationarily supported on the conveyor rollers 21, which rollers themselves remain substantially nonrotatable, so that the load L is advanced through a distance substantially equal to the stroke of the conveyor. During this advancing movement, the leading or downstream edge of the load L contacts the tip 41 of the dogs 31 causing them to be swung downwardly (clockwise) into the depressed position illustrated on the right side of FIG. 4, whereby the counterweight 38 associated with the dog 31 continuously urges same counterclockwise so that the roughened nose 43 slidably engages the lower surface of the load L during its advance.

After the load completely passes over and moves out of engagement with some of the upstream dogs 31, the biasing thereof by the counterweight causes each individual dog 31 to again swing counterclockwise into its upright position, as limited by the stop 37, thereby resulting in the tip 41 and specifically the stop surface 44 thereon being positioned above the conveying plane 39 so as to thus interfere with the load L to prevent same from moving backwardly (leftwardly).

After completing the forward or advancing stroke, the cylinder 26 is energized in the opposite direction, or alternately the cylinder 26′ is energized to retract or move the conveyor sections 11 rearwardly back to their original position. As the conveyor sections 11 are retracted, the frames 12 again are moved backward due to the wheels 16 rolling on the support surface 18. As the conveyor sections move backwards, the load L is prevented from moving backwards due to the engagement of the load L with the stop surface 44 associated with the upright dog 31. Accordingly, the conveyor section is retracted (leftwardly) from beneath the load L, this being permitted due to a clockwise rotation of the rollers 21 due to their rolling engagement with the lower surface of the load.

Due to the above operation, the load L is permitted to remain in its advanced position even though the conveyor can be freely retracted back to its initial position so as to permit the initiation of a further advance-retract cycle. By cyclically reciprocating the conveyor sections 11 back and forth in a repetitive manner through a predetermined stroke, the load L is thus intermittently unidirectionally moved in a steplike manner from the inlet end (leftward end) to the discharge end (rightward end) of the conveyor.

When the load is supported on the conveyor and is being intermittently advanced therealong, and specifically during the retraction of the conveyor sections, the tendency for the load to move backward is restricted not only by the upright dog 31 which is positioned closely adjacent the upstream end of the load, but is also restricted by those dogs 31 which are in their inclined position and are engaged with the bottom surface of the load, as illustrated by the dog 31 shown on the right side of FIG. 4. Due to the presence of the cam surface 42 and its termination in the roughened or serrated nose 43, this latter nose 43 engages the under surface of the load when the dog 31 is disposed thereunder. Any tendency for the load to move backwards, due to the retraction of the conveyor section, is resisted due to the relatively high frictional engagement which exists between the dog and the bottom surface of the load. The tendency for the load L to move backwards, due to the high friction which exists between the bottom surface of the load and the roughened nose 43, tends to swing the dog counterclockwise into its upright position but, since this results in the nose being swung upwardly above the conveying plane 39, this accordingly requires that the load be physically lifted upwardly out of engagement with the rollers 21. Since this is normally not possible, the load L thus remains stationary in its forwardmost advanced position, even though the conveyor sections 11 are retracted back into their original positions.

While the drawings illustrate the conveyor of the present invention as employing a pair of parallel conveyor sections 11, it will be appreciated that the present invention can utilize only a single such section, with the dogs being mounted in any desired relationship on a surrounding stationary support frame or support structure. For example, one or more rows of dogs could be provided adjacent one or both sides of the conveyor. Alternately, if the conveyor were positioned in close proximity to a side wall or a top support or wall, the dogs could be mounted above or to one side of the conveyor, while still permitting the conveyor to operate in the above-described manner. Further, several substantially identical conveyor sections 11 could be fixedly connected together so that the conveyor could thus extend over any desired length.

In a typical embodiment of this conveyor, the conveyor rollers 21 have a diameter of about 2½ inches, whereas the overall height or elevation of the conveyor as measured between the conveying plane 39 and the support surface 18 is approximately 3½ inches. Such a conveyor is thus of extremely low profile and is adaptable for use on substantially any existing flat support surface. At the same time, the conveyor is capable of satisfactorily handling rather heavy loads, such as engine blocks or the like which weigh several thousand pounds and may be mounted on slave pallets for conveying longitudinally of the system.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. An oscillating-accumulating conveyor, comprising:

horizontally elongated frame means defining a substantially horizontally extending longitudinal direction;

wheel means rotatably supported on said frame means at longitudinally spaced intervals and disposed for supporting and rolling engagement with a stationary horizontally extending support surface;

drive means for causing said frame means to be cyclically reciprocated back and forth in said longitudinal direction through a predetermined stroke, whereby said frame means is rollingly supported during said reciprocation due to said wheel means being rollingly engaged with said support surface;

a plurality of conveyor rolls mounted on said frame means at longitudinal intervals therealong, said conveyor rolls being individually freely rotatably supported on said frame means for individual rotation about horizontal axes which extend substantially perpendicular to said longitudinal direction, said conveyor rollers at their uppermost peripheral surface defining a substantially horizontal conveying plane which extends longitudinally of the conveyor, whereby a load to be conveyed can be supported on said conveyor rolls and moved longitudinally along said plane;

one-way holding means extending in said longitudinal direction for permitting said load to be forwardly moved along said conveyor during the forward stroke of said drive means while preventing rearward movement of said load during the rearward stroke of said drive means, whereby said conveyor rolls rollingly engage and support said load as the frame means and the conveyor rolls mounted thereon are retracted rearwardly relative to the load by said drive means, whereby the cyclic reciprocation of said frame means by said drive means causes the load to be intermittently advanced in a steplike manner along the length of the conveyor; and said one-way holding means including a plurality of individual one-way holding devices disposed at spaced intervals along a row which extends parallel to said longitudinal direction, each said holding device including a movable holding member swingably movably supported on a mounting structure which is fixedly secured relative to said support surface, said holding member being normally maintained in a first position wherein a part thereof projects upwardly for physical engagement with an end surface of the load for positively preventing the load from moving in said rearward direction, said holding member being movable by said load into a retracted position wherein the holding member is disposed in its entirety below the load in response to engagement of said holding member by said load during its forward movement so as to permit unrestricted free forward movement of the load during advancing of the conveyor, said holding member being provided with a roughened nose at the upper end thereof which is disposed for engagement with a bottom lower surface on the load when the holding member is positioned thereunder and is held thereby in said retracted position, whereby the roughened nose engages a bottom surface of the load to prevent rearward movement thereof.

2. A conveyor according to claim 1, wherein there is provided a pair of substantially identical elongated conveyor sections which are disposed in parallel, spaced, side-by-side relationship, each said conveyor section including said elongated frame means rollingly supported by said wheels and having said conveyor rollers individually freely rotatably supported thereon, said drive means being connected to both said conveyor sections for causing simultaneous and synchronized reciprocating movement thereof, said one-way holding means including a plurality of individual one-way holding devices positioned in spaced relationship within a row extending parallel to said longitudinal direction, said row of holding devices being disposed between said conveyor sections, and each said holding device including a movable holding member which is normally maintained in a raised stopping position wherein said holding member projects upwardly above the conveying plane defined by the rollers of said conveyor section as to be engageable with the loads and prevent rearward movement of the loads, said holding member being moved downwardly when engaged by a forwardly advancing load into a retracted position wherein the holding device is disposed under the load, the holding device being automatically returned into its raised position when the load passes thereover.

* * * * *